United States Patent
Kim et al.

(10) Patent No.: US 8,640,845 B2
(45) Date of Patent: Feb. 4, 2014

(54) CLUTCH DRIVING DEVICE

(75) Inventors: Jong Yop Kim, Seoul (KR); Sung Yong Cho, Hwaseong-si (KR); Hyun Duk Chang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 403 days.

(21) Appl. No.: 12/954,405

(22) Filed: Nov. 24, 2010

(65) Prior Publication Data

US 2011/0278128 A1 Nov. 17, 2011

(30) Foreign Application Priority Data

May 17, 2010 (KR) ........................ 10-2010-0045935

(51) Int. Cl.
  *F16D 23/12* (2006.01)
(52) U.S. Cl.
  USPC .......... 192/93 R; 192/84.6; 192/94; 192/99 S
(58) Field of Classification Search
  USPC ............. 192/70.23, 89.21, 93 B, 93 C, 70.29, 192/70.3, 84.6, 84.7, 85.51, 94, 99 S, 93 E
  See application file for complete search history.

(56) References Cited

U.S. PATENT DOCUMENTS

| 4,428,471 | A  | * | 1/1984  | Parker et al. ................ | 192/85.56 |
| 6,578,690 | B2 | * | 6/2003  | Gochenour ................ | 192/85.52 |
| 7,124,871 | B2 | * | 10/2006 | Friedmann et al. .......... | 192/99 S |
| 7,735,617 | B2 | * | 6/2010  | Ehrlich et al. ................ | 192/84.6 |
| 8,201,679 | B2 | * | 6/2012  | Burkhart et al. .......... | 192/111.12 |
| 8,381,889 | B2 | * | 2/2013  | Burkhart ................... | 192/48.607 |
| 2009/0000900 | A1 | * | 1/2009 | Becht ........................ | 192/70.252 |
| 2009/0078529 | A1 |   | 3/2009  | Ehrlich et al. | |
| 2009/0223772 | A1 |   | 9/2009  | Burkhart et al. | |

FOREIGN PATENT DOCUMENTS

KR  10-2004-0078568 A  9/2004
KR  10-2007-0037193 A  4/2007

* cited by examiner

*Primary Examiner* — David D Le
*Assistant Examiner* — Terry Chau
(74) *Attorney, Agent, or Firm* — Morgan, Lewis & Bockius LLP

(57) ABSTRACT

A clutch driving device includes a pair of first and second roller wing arms horizontally moving to both sides by moving body moving forward/backward on an axial center line of an actuator and a roller inclined cam surface defining a move path of a pivot is formed such that first and second roller wing arms horizontally move to both sides from the axial center line of actuator, on the surface of a lever generating a stroke at a release bearing. Therefore, the lever can be lifted above a clutch engagement gap where a sufficient stroke is generated at the release bearing engaging a clutch, such that it is possible to achieve sufficient performance even if the output of actuator is reduced by the amount of energy consumption which is relative reduced.

5 Claims, 5 Drawing Sheets

(A)

ACTUATOR OPERATON FORCE (B)

(C) CROSS SECTION ON PIVOT B (A)
prior Art (B)
prior Art

CLUTCH DRIVING DEVICE

CROSS-REFERENCE TO RELATED APPLICATIONS

The present application claims priority to Korean Patent Application Number 10-2010-0045935 filed May 17, 2010, the entire contents of which application is incorporated herein for all purposes by this reference.

BACKGROUND OF THE INVENTION

1. Field of the Invention

The present invention relates to a clutch driving device, particularly a clutch driving device that operates a clutch in a horizontal motion and vertical translation method, by generating lever-sided vertical translation via a move distance of rollers horizontally moving to both sides and converting the vertical translation into operational translation for pressing a release bearing.

2. Description of Related Art

In general, while manual transmissions operate, the engine power is temporarily cut before the shift gear is engaged, and then the engine power is transmitted after the shift gear is engaged, and clutches are used for this operation.

A pedal type clutch driving device having a structure including a clutch pedal and a clutch and pressing a clutch pack connected to the clutch pedal with a force transmitted from the clutch pedal is commonly used to operate the clutch. The pedal type clutch driving device is generally used for a manual transmission.

The pedal type clutch driving device using a clutch pedal is a constant-close type, in which as a driver presses down the clutch pedal, the force pressing the clutch is removed, such that the gears can be shifted.

AMTs (Auto Manual Transmission) have been developed and practically applied to vehicle, which have the convenience of automatic transmissions, in addition to the advantages of manual transmission, with the technological development.

Further, DCTs (Double Clutch Transmission) are called a second generation AMT by using two clutches divided from the input shaft of a manual transmission and having a clutch/gear actuator.

The DCT has two clutches respectively connected to an odd-numbered shift input shaft and an even-numbered shift input shaft and is classified into a wet type similar to a wet type multi-plate type and a dry type similar to a clutch, in accordance with the clutch type.

Accordingly, the DCT is implemented in a pre-selection way that engages in advance a shift gear connected with a second clutch in traveling where a first clutch is connected with the engine, that is, shifting according to the traveling condition is performed in advance in the gear train.

The two clutches connected to the odd-numbered shift input shaft and the even-numbered shift input shaft are operated by a clutch driving device, which uses electric actuator for operating the clutches.

In general, electric actuator requires an operational structure for holding the clutch and a clutch self-opening function for ensure fail safety concept when power is cut in the vehicle.

FIG. 5 show a clutch driving device equipped with an electric actuator having the function.

As shown in FIG. 5A, the clutch driving device includes a clutch 100, a release bearing 200 changing the stroke to engage clutch 100, a lever 300 lifted to pressure release bearing 200, a reciprocating body 400 lifting lever 300 while moving in the longitudinal direction of lever 300 along support plate 310, and an actuator 500 moving forward/backward reciprocating body 400 in the longitudinal direction of lever 300, using a screw rod 510.

Actuator 500 is composed of a motor.

In this structure, a pivot point B where reciprocating body 400 moves in the longitudinal direction of lever 300 with respect to lever 300, the total force applied to release lever 200 satisfies Ft=Fs(b/a).

Ft is the total force applied to release bearing 200, Fs is lever spring tensile force, a is the distance from the pivot point B to the point of action C, and b is the distance from the point of the force A to the pivot point B.

The point of the force A is the position where reciprocating body 400 is not moved by the operation of the clutch in the entire length L of lever 300, the pivot point B is the support point of reciprocating body 400 with respect to lever 300, and the point of action C is the position where lever 300 applies force to release bearing 200.

FIG. 5B shows the relationship of force according to mechanical dynamics relationships when the clutch driving device described above operates.

As shown in the figure, as actuator 500 is operated to engage clutch 100, reciprocating body 400 moves forward in the length direction of the lever 300 by the rotation of screw rod 510 and pivot point B correspondingly moves.

Pivot point B moves in the longitudinal direction of lever 300 in accordance to the move distance of reciprocating body 400, such that the distance b from the point of the force A to the pivot point B increases and the total force Ft applied to release bearing 200 increases in the relationship Ft=Fs(b/a). Accordingly, the force applied to clutch 100 through bearing 200 increases and the clutch is strongly engaged.

As described above, a mechanical structure changing the position of the pivot point B of reciprocating body 400 in the longitudinal direction of lever 300 is used in order to variably use the lever ratio b/a in this method.

However, since the change in lever ratio b/a for operating clutch 100 is made by the positional change of the pivot point B, the change in the force of action depending on the position of the pivot point B should be reflected to lever 300. Further, since the operational force of clutch 100 is achieved by forward/backward move of the pivot point B in the longitudinal direction of lever 300, energy consumption increases.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a clutch driving device that can achieve sufficient performance with an actuator having small output by minimizing a move distance the rollers for transform at a lever and largely reducing energy consumed to operate a clutch, by generating operational translation for operating the clutch with a stroke of a release bearing which is proportionate to vertical translation, with a pair of rollers horizontally moved and the lever vertically moved by the actuator, which is a motor.

An aspect of the present invention provides a clutch driving device including an actuator that is a power source, an energy applying unit that makes a move path of a pivot point moving to the left and right of the axial center line of the actuator, and changes force engaging a clutch in proportion to a change of stroke made by the move path of the pivot point.

The energy applying unit includes a lever having a roller inclined cam surface that is left-right symmetric with respect to the axial center line such that the move path of the pivot point is formed at the left and right sides of the axial center line of the actuator, a moving body converting rotation of the actuator into straight motion to implement forward move moving away from the actuator and backward move moving toward the actuator, and a pair of first and second roller wing arms changing in move distance to the left and right generated by the move path of the pivot moving along the roller inclined cam surface when the distance of the forward-backward move of the moving body changes, and increasing pressing force for a release bearing for operating the clutch at a lifted height of the lever which is lifted in proportion to the change of the move distance.

The other side that is the opposite side to the roller inclined cam surface is supported by a lever spring to function as a hinge point such that one side with the roller inclined cam surface of the lever is lifted when the lever is lifted.

The roller inclined cam surface defines the move path of the pivot point which has a cross section with an incline declined from a predetermined point on the axial center line of the actuator or a cross section with an opposite incline.

Rollers are disposed at both ends of the moving body to be in rolling-contact with the first and second roller wing arms and the moving body has a nut thread-fastened to the screw rod.

The moving body may be moved forward/backward by hydraulic pressure or pneumatic pressure.

The first and second roller wing arms have one end supported by a pivot shaft to be a pivot center and the other end having a roller to be in rolling-contact with the roller inclined cam surface, and the roller is composed of a pair of front roller and a rear roller adjacent to the front roller.

According to the present invention, a release bearing may be moved by vertical translation of a lever by rollers horizontally moving to both sides and the vertical translation is converted into operational translation for operating a clutch, therefore, the move distance of the rollers at the lever operating the clutch is reduced and energy consumption is reduced, such that it is possible to reduce output of an actuator as much as the reduced amount of energy.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
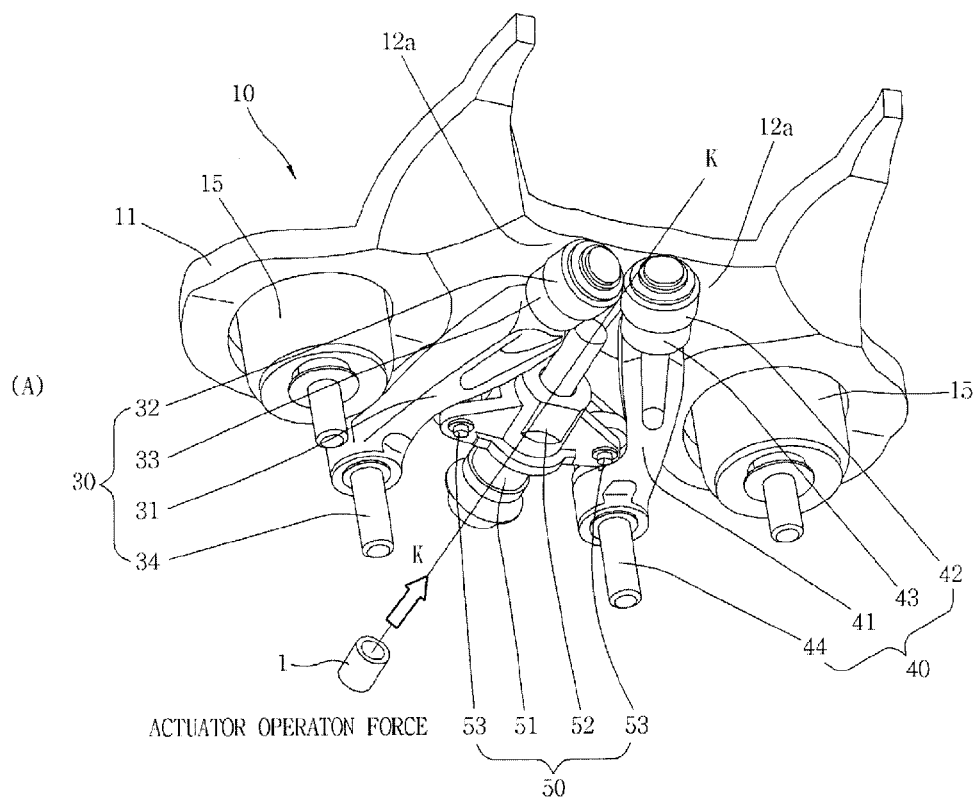
FIGS. 1A, 1B and 1C are views showing the state before a clutch driving device according to the present invention operates.
Figure 1:
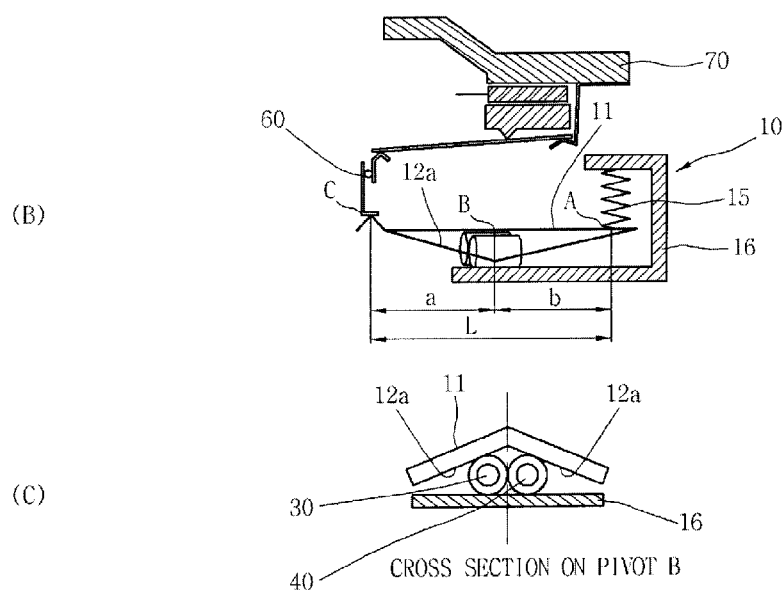

As shown in FIG. 1, the clutch driving device includes an actuator 1 generating rotational power and an energy applying unit engaging a clutch 70 by generating a stroke to a release bearing 60 while moving left and right with respect to both sides from the axial center line K-K of actuator 1 while converting the rotation of actuator 1 into a straight motion.

Although a motor is used for actuator 1, actuators using hydraulic pressure or pneumatic pressure can be used.

The clutch driving device according to the present invention is called a horizontal motion and vertical translation type clutch driving device (HVCDD), which is based on that an energy applying unit is provided, which horizontally moves left and right with respect to the axial center line K-K of actuator 1 and converts the horizontal motion into pressing force that presses the clutch by generating vertical translation.

The energy applying unit includes a roller unit composed of a pair of first and second roller wing arms 30, 40 positioned at both left and right sides from the axial center line K-K of actuator 1, a reciprocating unit 50 moving forward/backward along the axial center line K-K of actuator 1 by converting the rotation of actuator 1 into straight motion, and a lever unit 10 generating a stroke to a release bearing 60 that engages or disengages clutch 70 by moving up/down by first and second roller wing arms 30, 40 horizontally moving left and right with respect to the axial center line K-K, when reciprocating unit 50 moves forward/backward.

Lever unit 10 includes a lever 11 having an point of force A that is a hinge center portion where a lever spring 15 is installed when being lifted and a point of action C lifting release bearing 60 at the opposite side on the axial center line K-K of the actuator 1, and a pivot point B is defined between the point of force A and the point of action C.

In various embodiments, the point of force A and the point of action C have fixed positions, whereas the pivot point B has a move path formed horizontally to the left and right with respect to both sides from the axial center line K-K of actuator 1. For this configuration, a roller inclined cam surface 12a that is symmetric with respect to the axial center line K-K while bending at an angle to the left and right sides to a predetermined point of the axial center line K-K at lever 11 is formed, thereby forming a move path of pivot point B on roller inclined cam surface 12a.

The inclination angle at which roller inclined cam surface 12a bends to the left and right sides from the axial center line K-K depends on the increase in height of lever 11, while the width in which the inclination angle is formed to the left and right sides depends on the number of rollers of first and second roller wing arms 30, 40 and the width of the rollers in the roller unit.

Further, roller inclined cam surface 12a may be stepped at different inclination angles, in which the step formed in roller inclined cam surface 12a depends on the increase in height of lever 11.

By the geometric relationships of the point of force A, point of action C, and point of pivot point B to lever 11, the distance 'a' from the pivot point B to the point of action C and the distance 'b' from the pivot point B to the point of force A are fixed with respect to the length L of lever 11, and the lever ratio b/a is fixed to a predetermined value without changing, such that lever 11 can have a fixed lever ratio b/a in various embodiments.

Further, the roller unit and reciprocating unit 50 are disposed in a space where lever 11 having roller inclined cam surface 12a and a bottom plate 16 having a flat surface, reciprocating unit 50 moves forward/backward on the axial center line K-K of actuator 1, and the roller unit lifts lever 11 while moving along the horizontal path made by the pivot point B of roller inclined cam surface 12a of lever 11.

As the roller unit moves as described above, lever 11 moves up as much as the height difference proportionate to the inclination angle of roller inclined cam surface 12a and generates a stroke of release bearing 60, and the stroke acts as pressing force engaging clutch 70.

The roller unit includes the pair of first and second roller wing arms 30, 40 arranged at the left and right sides of the axial center line K-K of actuator 1 and pivot shafts 34, 44 functioning as pivot centers at one end when first and second roller wing arms 30, 40 horizontally move to the left and right sides.

That is, first and second roller wing arms 30, 40 have wing arms 31, 41 each having one end fixed to pivot shafts 34, 44 and a roller freely rotating at the opposite ends, respectively, and the rollers are composed of pairs of front and rear rollers 32, 42, 33, 43, respectively.

Front rollers 32, 42 roll on roller inclined cam surface 12a, whereas rear rollers 33, 43 contacts bottom plate 16 without being in rolling-contact with roller inclined cam surface 12a, in which the move of rear rollers 33, 34 is because rear rollers 33, 43 has a diameter smaller than front rollers 32, 42.

Pivot shafts 34, 44 may be integrally formed with wing arms 31, 41 or connected thereto.

Figure 2:
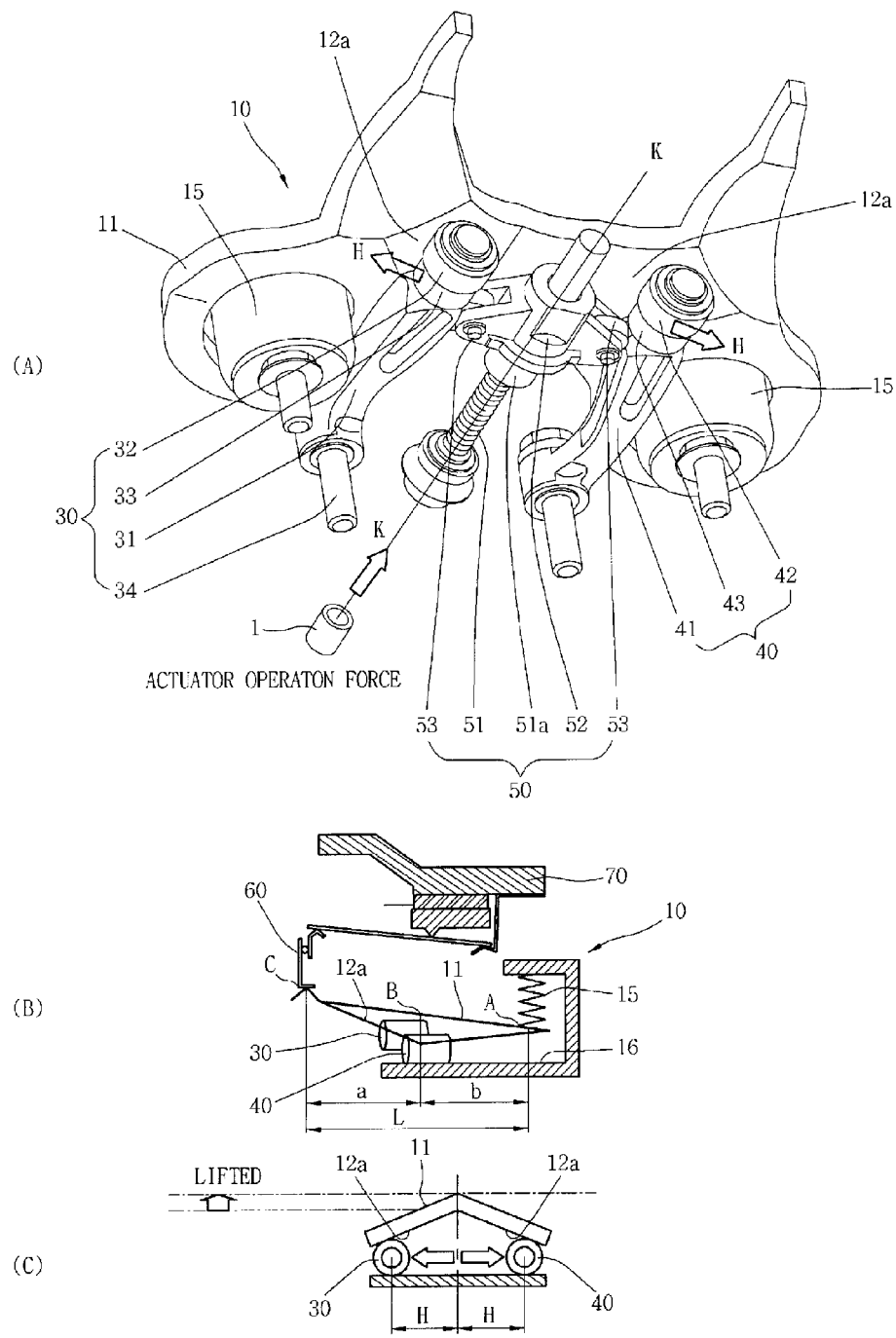
FIGS. 2A, 2B and 2C are views showing the state after a horizontal motion and vertical translation typed clutch driving device according to the present invention operates.

As shown in FIG. 2, reciprocating unit 50 according to various embodiments includes a screw rod 51 rotating on the axial center line K-K of actuator 1, a moving body 52 moved forward/backward on the axial center line K-K by a nut 51a thread-fastened to screw rod 51, and rollers 53 disposed at both sides of moving body 52.

The maximum width of moving body 52 is the same as the width H made by the maximum horizontal motion of first and second roller wing arms 30, 40 of the roller unit.

Roller 53 moves first and second roller wing arms 30, 40 while contacting first and second roller wing arms 30, 40 when moving body 52 moves forward, such that first and second roller wing arms 30, 40 can move without friction resistance.

Although reciprocating unit 50 uses motor type actuator 1 as a power source for reciprocating moving body 52, actuator 1 can be simply implemented in various types, such as hydraulic or pneumatic type.

When a hydraulic or pneumatic actuator is used, the screw rod and the nut which convert the rotation into straight motion are not required between actuator 1 and moving body 52, such that the configuration can be simplified.

It is possible to make the move of first and second roller wing arms 30, 40 opposite in various embodiments, which is possible because the move depends on the inclined structure of roller inclined cam surface 12a that is in rolling-contact with first and second roller wing arms 30, 40.

That is, as described above, when roller inclined cam surface 12a forming the move path of the pivot point B has a "Λ" shape that is declined to the left and right sides of a predetermined point on the axial center line K-K of actuator 1, first roller wing arm 30 and second roller wing arm 40 implement move on the move path of the pivot point B horizontally moving to the left and right side to be opened from the axial center line K-K of actuator 1.

On the contrary, when roller inclined cam surface 12a forming the move path of the pivot point B has a "V" shape having opposite inclines bent upward to the left and right sides of a predetermined point on the axial center line K-K of actuator 1, first roller wing arm 30 and second roller wing arm 40 implement move on the move path of the pivot point B horizontally moving from both sides from the axial center K-K of actuator 1 to be closed.

The present invention does not cause a structural change in the energy applying unit even if roller inclined cam surface 12a having the "V" shape with opposite inclines as described above is used, this is because one end of each of first roller wing arm 30 and second roller wing arm 40 is hinged and moved horizontally to the left and right sides by pivot shafts 34, 44.

That is, when lever 11 having roller inclined cam surface 12a having the "V" shape with opposite inclines as described above is used, the portions closed to pivot shafts 34, 44 of first roller wing arm 30 and second roller wing arm 40 are moved toward each other while the opposite portions are maximally opened, such that the entire structure of the energy applying unit substantially changes.

In various embodiments using roller inclined cam surface 12a having the "V" shape with opposite inclines, first roller wing arm 30 and second roller wing arm 40 implement move along the move path of the pivot point B closing from the left and right sides of the axial center line K-K of actuator 1 and this close move is converted into lift transform of lever 11, such that a stroke of clutch bearing 60 is generated and the clutch operates.

In the above described embodiments, although the move path of the pivot point B horizontally moving to the left and right side with respect to the axial center line K-K was described on the basis of roller inclined cam surface 12a formed at lever 11, first roller wing arm 30 and second roller wing arm 40 may be disposed between lever 11 and bottom plate 16 and move therebetween in rolling-contact, therefore, the same operation can be implemented and obviously, it is possible to achieve the objects of the present invention, even if a flat bottom is formed at lever 11 and roller inclined cam surface 12a having the "Λ" or the "V" shape with an opposite incline cross section is formed at bottom plate 16.

FIGS. 3A and 3B are side and rear views showing the state before and after the clutch driving device according to the present invention operates.

The clutch driving device changes from the state shown in FIG. 3A where actuator 1 does not operate to the state shown in FIG. 3B where actuator 1 operates, in which the energy supply unit operates.

In various embodiments, when roller inclined cam surface 12a is declined in the "Λ" shape to the left and right sides from a predetermined point on the axial center line K-K of actuator 1, in which as actuator 1 operates, first roller wing arm 30 and second roller wing arm 40 implement move along the move path of the pivot point B horizontally moving to the left and right sides from the axial center line K-K to be opened, and the operation is described on the basis of the move.

The energy applying unit lifts lever 11 provides an operation gap At where first and second roller arms 30, 40 fixed to pivot shafts 34, 44 maximally open to the left and right sides from the axial center line K-K of actuator 1, and operation gap At functions of defining a clutch engagement gap Et at lever 11 by lifting up lever 11, when actuator 1 operates.

That is, as screw rod 51 of reciprocating unit 50 is moved by actuator 1, moving body 52 moves forward/backward on the axial center line K-K of actuator 1 by nut 51a thread-fastened to screw rod 51, such that first and second roller wing arms 30, 40 are opened or closed to the left and right sides with respect to the axial center line K-K, thereby implementing move making the move path of the pivot point B.

For example, when moving body 52 moves forward, similar to the change shown in FIGS. 3A and 3B, the move distance of moving body 52 changes from X to X' with respect to a predetermined fixed distance Y, and first and second roller wing arms 30, 40 opened to both sides by the change from X to X' of the move distance are opened to both sides as much as the maximum width H along the move path of the pivot point B horizontally moving to the left and right side from the axial center line K-K.

In this operation, the clutch driving device according to the present invention has the point of force A and the point of action C at both ends in the longitudinal direction of lever 11 and also have lever 11 having roller inclined surface 12a defining the move path of the pivot point B that is left-right symmetric with respect to the axial center line K-K, such that the pivot B is positioned between the point or force A and the point of action C and does not move in the longitudinal direction of lever 11 and the lever ratio b/a of lever 11 is also fixed.

In this state, first and second roller wing arms 30, 40 are horizontally moved away from each other to the left and right along the move path of the pivot B from the axial center line K-K and opened to the maximum width H, such that the portion of the point of action C is lifted (vertically) in lever 11 and operational transform is generated at release bearing 60.

Figure 3:
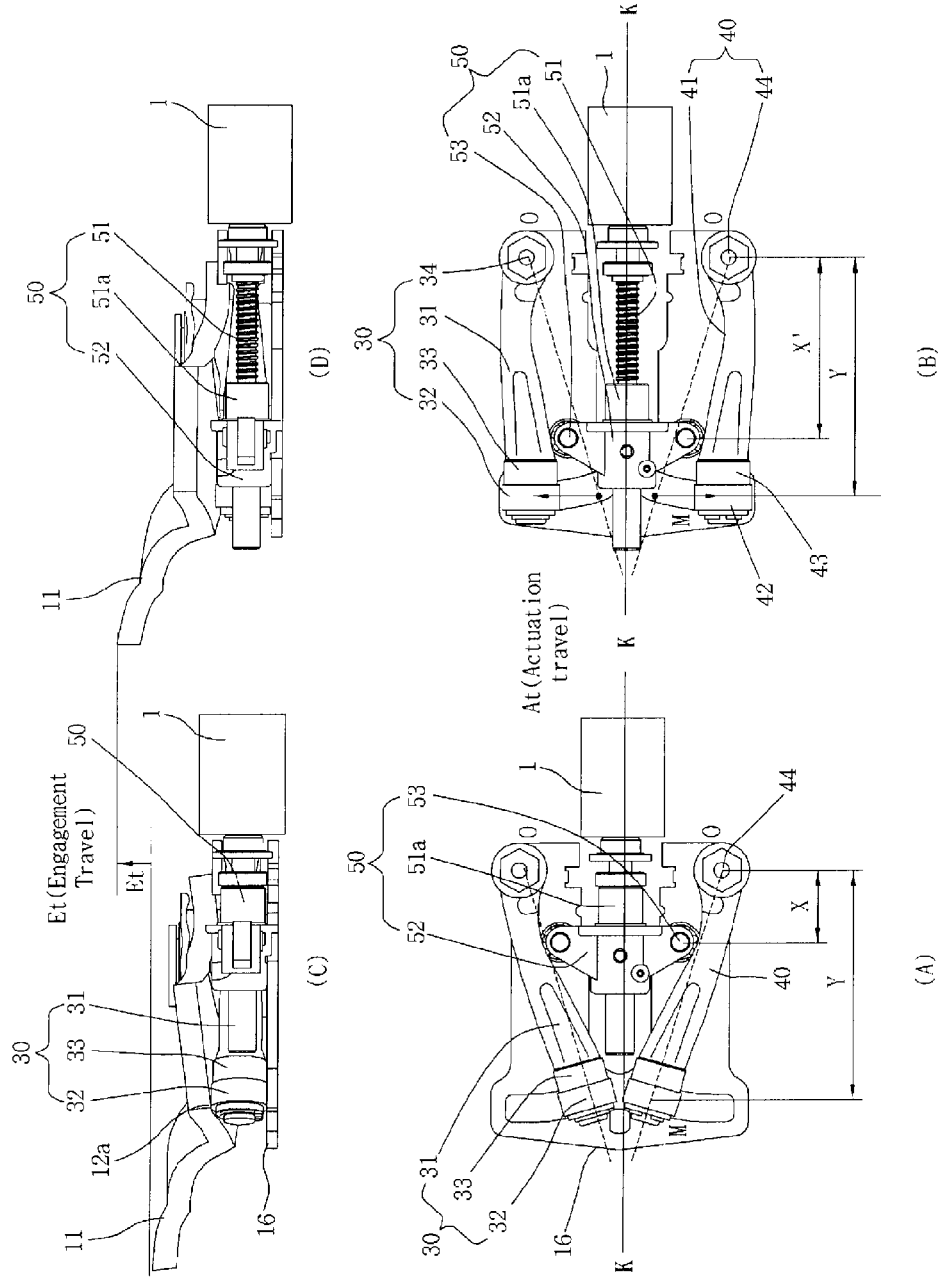
FIGS. 3A, 3B, 3C and 3D are respective side and rear views showing the state before and after the clutch driving device according to the present invention operates.
Figure 4:
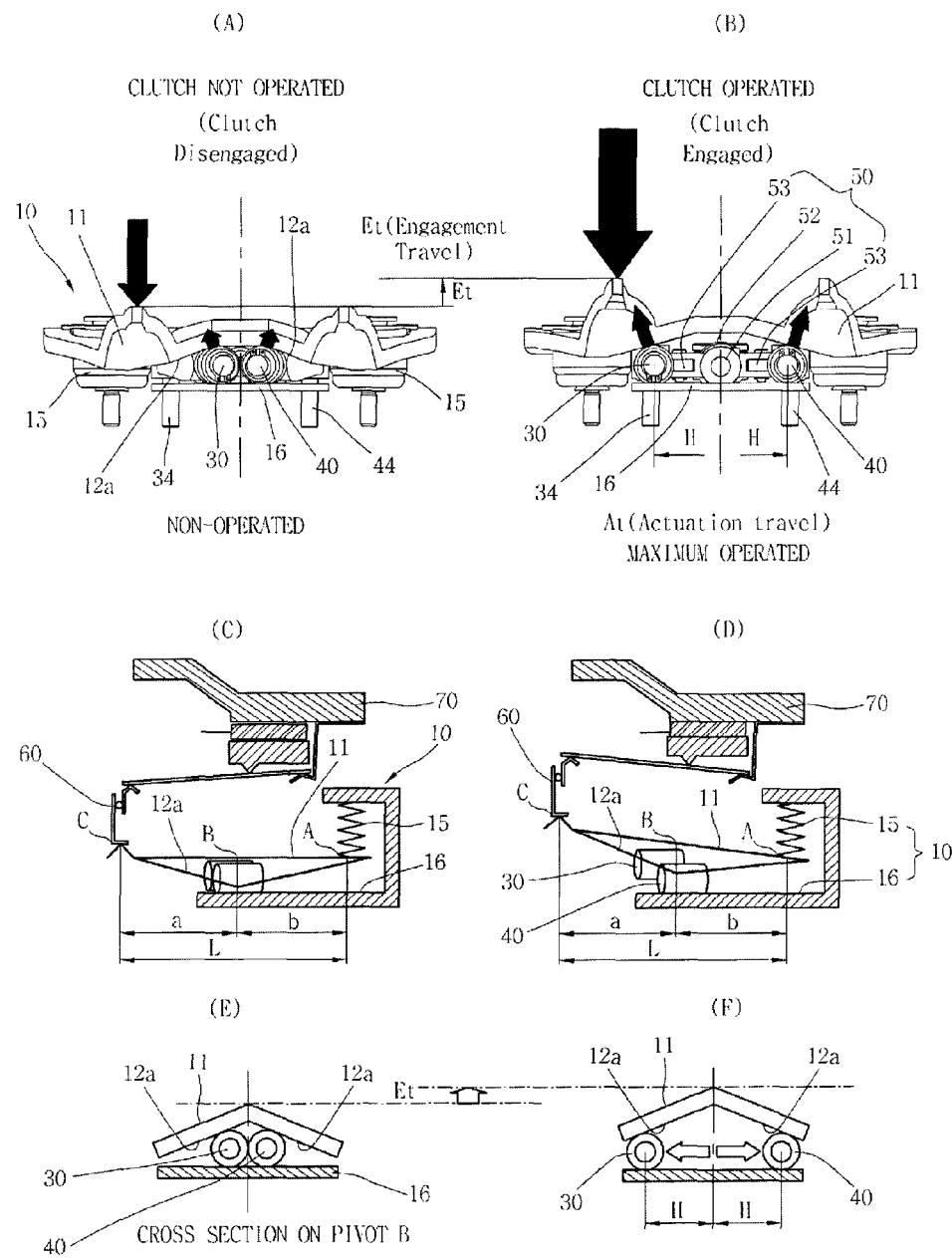
FIGS. 4A, 4B, 4C, 4D, 4E and 4F are views mechanically showing the state before and after the clutch driving device according to the present invention operates.
Figure 5:
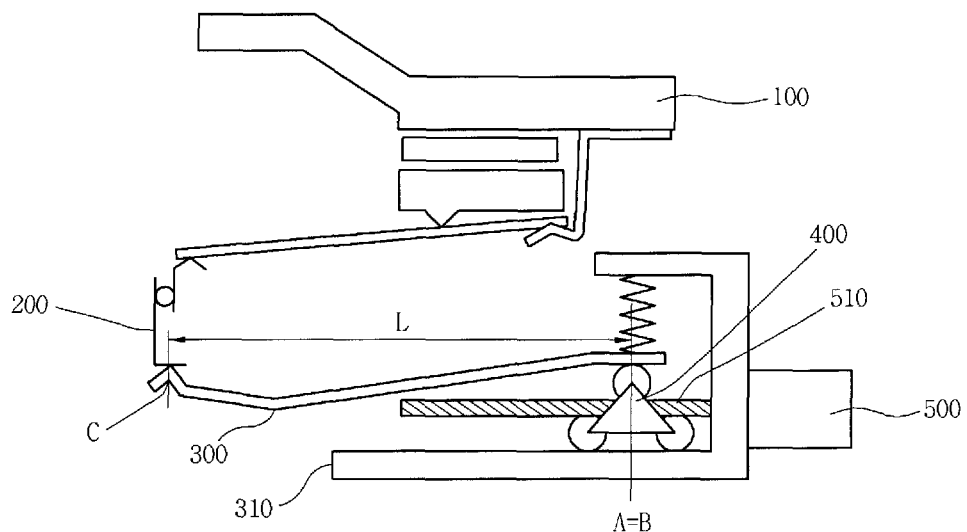
FIGS. 5A and 5B are views illustrating the configuration of a clutch driving device equipped with an electric actuator according to the related art.
Figure 5:
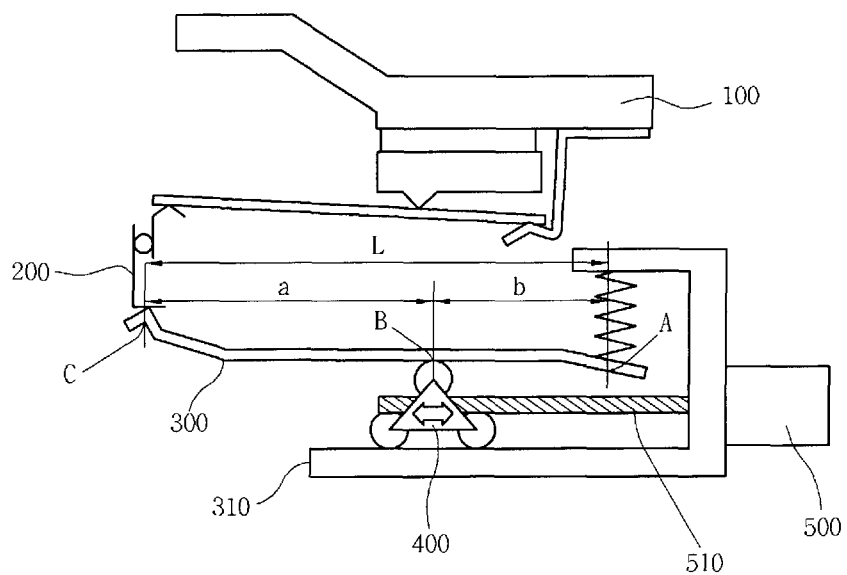

FIGS. 4A and 4B are views mechanically showing the state before and after the clutch driving device shown in FIG. 3.

In FIG. 4A where the clutch driving device does not operate and clutch 70 is not engaged, actuator 1 does not operate and moving body 52 is fully pulled to actuator 1, such that front and rear rollers 32, 42, 33, 44 of first and second roller wing arms 30, 40 are closed to the axial center line K-K of actuator 1, which is the initial state of the energy applying unit.

As the clutch driving unit operates from the above state, as shown in FIG. 4B, clutch 70 becomes engaged.

As shown in the figures, as actuator 1 operates and screw rod 51 is rotated, moving body 52 thread-fastened to screw rod 51 by nut 51a moves forward along screw rod 51 (moving away from actuator 1) and the energy applying unit is operated by the forward move of the moving body 52.

As the energy applying unit operates, first and second roller wing arms 30, 40 closed to the axial center line K-K of actuator 1 are further opened along the move path of the pivot B of roller inclined cam surface 12a of lever 11 with the increase of the move distance of moving body 52, such that first and second roller wing arms 30, 40 can be fully opened to the maximum width H.

In this operation, front rollers 32, 42 of first and second roller wing arms 30, 40 roll on roller inclined cam surface 12a of lever 11 and rear rollers 33, 43 roll on bottom plate 16.

When first and second roller wing arms 30, 40 hinged to pivot shafts 34, 44 are fully opened to the maximum width H by the operation described above, the upward move of lever 11 with respect to point of action C is also increased in proportion to the increase of the opening move distance of first and second roller wing arms 30, 40. Accordingly, operational translation finally pressing release bearing 60 increases as much as clutch engagement gap Et at lever 11.

As described above, release bearing 60 transmits operational translation according to the stroke generated at lever 11 by force Ft concentrated on the point of action C of lever 11 to clutch 70, clutch 70 is engaged by the transmitted operational translation and converted into the operation state.

As can be seen from the above, in the clutch driving device according to various embodiments, first and second roller wing arms 30, 40 horizontally moving to the left and right sides to be opened are provided, and first and second roller wing arms 30, 40 lift lever 11 as much as clutch engagement gap Et by the move path of the pivot point B of roller inclined cam surface 12a which is left-right symmetric with respect to the axial center line K-K of actuator 1, therefore, energy consumption is relative reduced and it is possible to implement sufficient performance even if the output of actuator 1 decreases when clutch 70 operates.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch driving device comprising:
   an actuator that is a power source; and
   an energy applying unit that moves a pivot point along a move path to left or right side of an axial center line of the actuator, and changes a force engaging a clutch in proportion to stroke displacement along the move path by the pivot point,
   wherein the energy applying unit includes:
   a lever having a roller inclined cam surface that is left-right symmetric along a direction perpendicular to a longitudinal axis of the axial center line,
      wherein the move path is formed at the left and right sides of the axial center line of the actuator, and
      wherein the roller inclined cam surface defines the move path and has a cross section with an incline declined from a predetermined point on the axial center line of the actuator or a cross section with an opposite incline;
   a moving body moving along the axial center line and converting rotation of the actuator into straight motion to implement a forward movement moving away from the actuator and a backward movement moving toward the actuator,
   a pair of first and second roller wing arms,
      wherein the first and second roller wing arms change in a movement distance from the axial center line to the left and right sides of the axial center line in moving along the roller inclined cam surface by the moving body when the distance of the forward-backward movement of the moving body changes,
      wherein the first and second roller wing arms increase a pressing force for a release bearing for operating the clutch at a lifted height of the lever which is lifted in proportion to the change of the move distance, and
      wherein the first and second roller wing arms have one end supported by a pivot shaft to be a pivot center and the other end having a roller to be in rolling-contact with the roller inclined cam surface.

2. The clutch driving unit as defined in claim 1, wherein another side of the lever opposite to the roller inclined cam surface is supported by a lever spring to function as a hinge point such that the roller inclined cam surface of the lever is lifted, when the lever is lifted.

3. The clutch driving device as defined in claim 1, wherein rollers are disposed at both ends of the moving body to be in rolling-contact with the first and second roller wing arms.

4. The clutch driving device as defined in claim 3, wherein the moving body has a nut thread fastened to a screw rod.

5. The clutch driving device as defined in claim 1, wherein the roller is composed of a pair of front roller and a rear roller adjacent to the front roller.

\* \* \* \* \*